May 18, 1943. W. J. FIEDLER 2,319,592
WINDMILL
Filed July 24, 1940 3 Sheets-Sheet 3

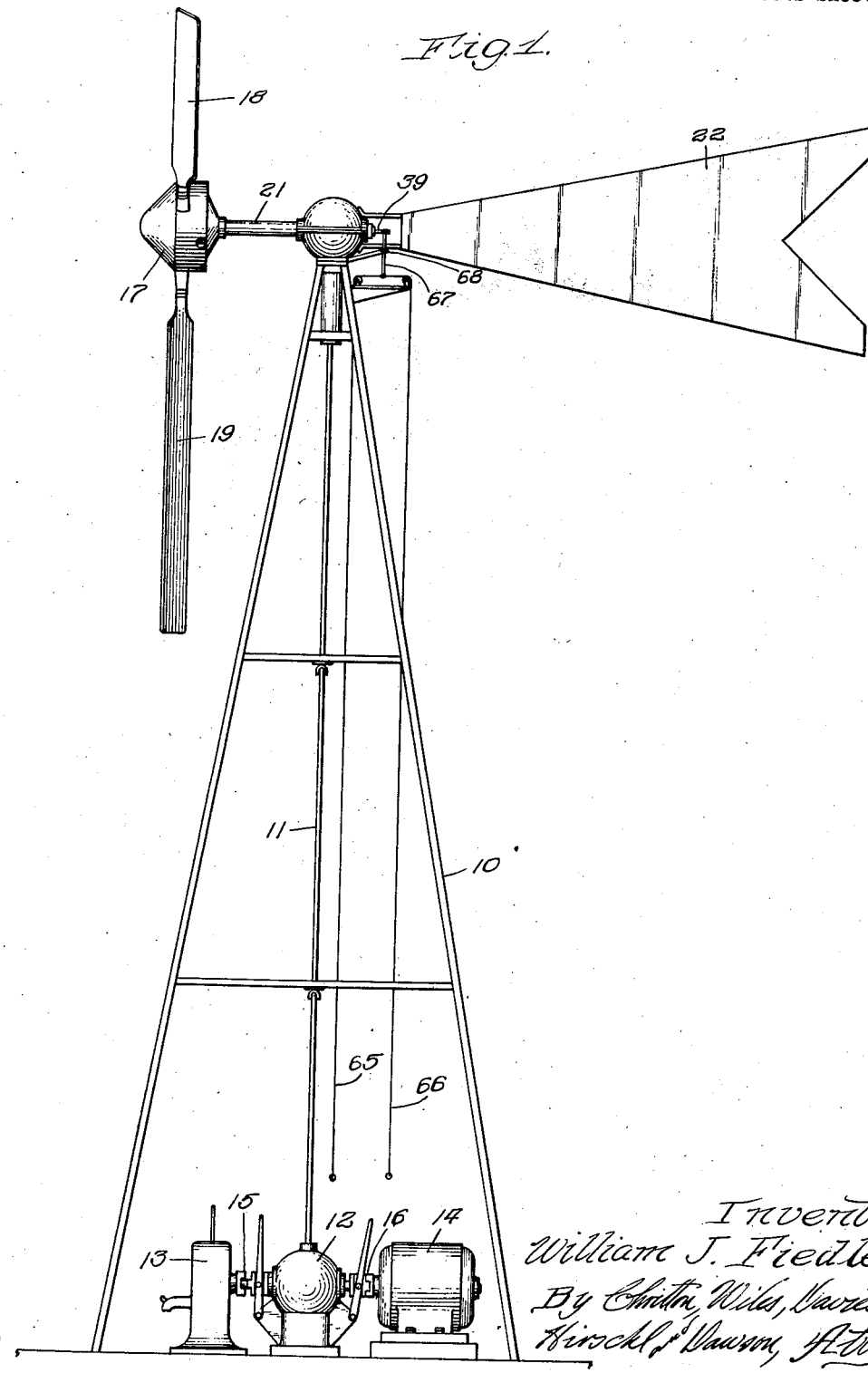

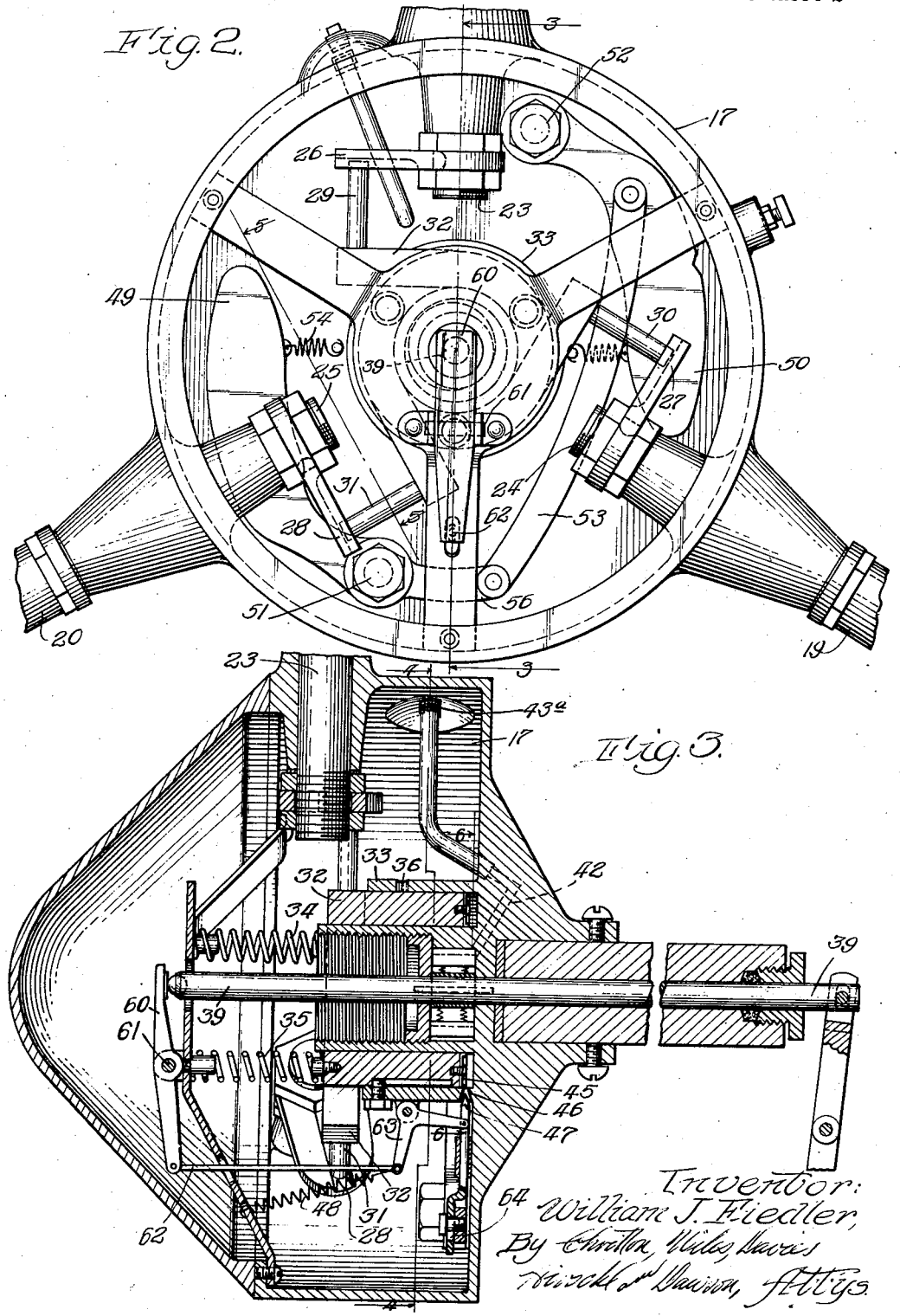

Inventor:
William J. Fiedler,
By Chritton, Wiles, Davies, Worrell & Mason,
Attys.

Patented May 18, 1943

2,319,592

UNITED STATES PATENT OFFICE 2,319,592

WINDMILL

William J. Fiedler, Mitchell, S. Dak., assignor to Wind Governor Corporation, a corporation of South Dakota Application July 24, 1940, Serial No. 347,327

1 Claim. (Cl. 170—68)

This invention relates to a windmill, and more particularly to pitch control governing mechanism therefor.

Figure 4:
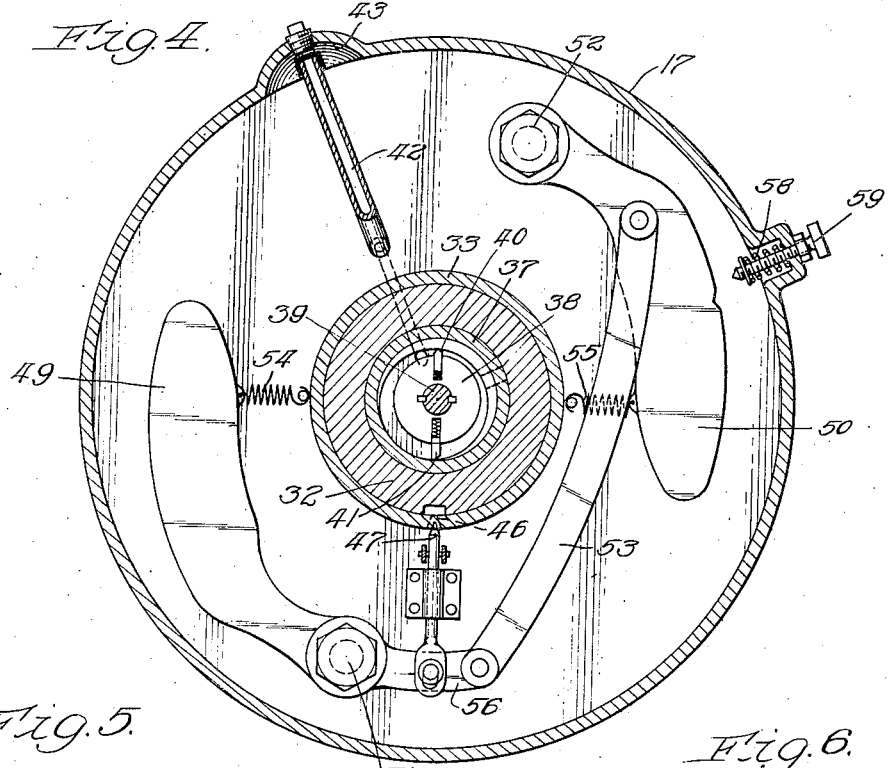
Figure 5:
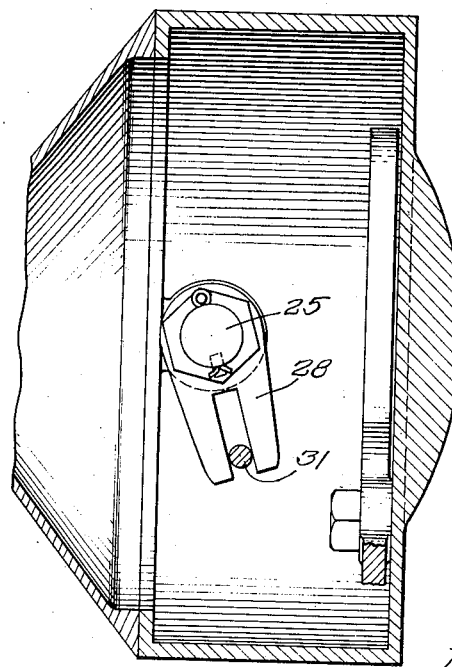
Figure 6:
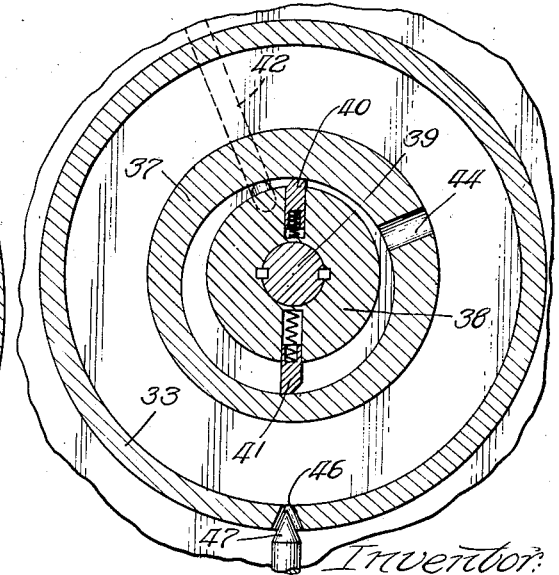

One feature of this invention is that it provides an improved means for obtaining substantial amounts of power from the wind; another feature of this invention is that the blades of the windmill are rotatable about their longitudinal axes to enable variation of their pitch; a further feature of this invention is that it insures operation of the windmill at or near a desired speed of rotation despite wide variations in the velocity of the wind actuating it; still another feature of this invention is that the governing mechanism may be housed completely within the hub of the windmill, deriving its operative power and control from the rotation of the windmill; yet a further feature of this invention is that the automatic control may be superseded by manually operable means; another feature of this invention is that the governing mechanism is smooth and efficient in its action; other features and advantages of this invention will be apparent from the following specification and the drawings, in which:

Figure 1 is a side elevation of complete apparatus embodying my invention; Figure 2 is a view of the front of the windmill with the front portion of the housing removed; Figure 3 is a sectional view along the line 3—3 of Figure 2; Figure 4 is a sectional view along the line 4—4 of Figure 3; Figure 5 is a sectional view along the line 5—5 of Figure 2; and Figure 6 is a sectional view along the line 6—6 of Figure 3.

Windmills, particularly for driving electric generators for farm power and lighting purposes, have been coming into increasingly widespread usage in the past few years. These windmills generally have a few relatively long narrow blades of air-foil cross section, and present problems peculiar to themselves. One of these problems is governing the speed of rotation of such a windmill to obtain the optimum rate of rotation of a generator to which it may be connected despite widespread variations in wind velocity.

In order that the windmill may build up a speed of rotation at low wind which will be sufficient to generate a desired voltage, as one slightly in excess of 32 volts for a conventional farm lighting plant, it is necessary that the pitch of the blades be rather small. On the other hand, if no governing means is provided a high wind velocity would rotate a windmill having low pitch blades at such a high rate as to impose great strain on its mechanical parts, and cause danger of burning out the generator and associated equipment because of excess voltage. Various means of slowing down the rate of rotation of the windmill at higher wind velocities have heretofore been used, but these have all been objectionable and had defects in practice. I provide an improved form of governor which obviates the defects of previous types by making the blades of the windmill rotatable about their longitudinal axes, and varying the pitch substantially in accordance with variation in wind velocity to maintain the rate of rotation substantially constant at any wind velocity above that necessary to bring the windmill up to such rate. Change of pitch of the blades is accomplished, in my invention, by power generated by rotation of the windmill and controlled by the rate of such rotation.

In the particular apparatus illustrated herewith as one example of my invention, an elevated tower 10 supports at the top thereof a windmill, power from the windmill being transmitted to the ground through a rotatable vertical shaft 11 comprising sections joined by universal joints. Power from the windmill is delivered through the shaft 11 to a transmission 12, the arrangement being such that this power may be selectively used to drive either a pump 13 or a generator 14, selection being made my manually operable clutches 15 and 16. The generator may be of a conventional heavy duty type used in connection with 32-volt farm lighting systems, or of a type adapted for use with 110-volt or even 6-volt systems. It will also be understood, of course, that in so far as my governor is concerned the invention will be equally adapted to use with the type of windmill where the generator is mounted at the top of the tower and direct connected or geared to the rotating windmill. Turning now more particularly to the windmill proper, a housing 17 provides the hub on which are mounted three blades, as 18, 19 and 20. The hub or housing 17 is rigidly connected to a hollow shaft 21, so that rotation of the windmill is effective, through this shaft, to drive another shaft (as the shaft 11 in Figure 1) or the rotor of a generator mounted directly thereon. A tail or vane 22 serves to stabilize the windmill and keep it facing into the wind at all times.

Referring now more particularly to some of the detail showing of the housing 17 and the mechanism contained therein, it will be seen that shaft portions 23, 24 and 25 of the blades 18, 19 and 20, respectively, extend into the housing and have at their inner ends crank arms 26, 27 and 28. These are slotted or grooved to cooperate with pins 29, 30 and 31 mounted on extensions at one end of an annular or hollow piston 32. It will be understood, of course, that the pins could be integral with the crank arms and movable in slots in the extensions, it only being necessary that there be some play between these parts in order that there may be rotary movement of the blades about their longitudinal axes upon back and forth movement of the piston 32.

The annular piston 32 is mounted for reciprocation in a double-barreled or annular cylinder 33, being normally urged toward the bottom of said cylinder (to the right, speaking with respect to Figure 3) by springs such as 34 and 35. The arrangement is such that when the piston 32 is at the bottom of the cylinder 33 the pitch of the blades is at a minimum, the outer ends of their blades preferably making an angle at this point between 13 and 16 degrees with the plane of rotation. Provision is made for supplying fluid under pressure to the cylinder, and as the pressure and quantities of fluid therein increase the piston is forced outwardly against the resistance of the springs, changing the pitch of the blades as it moves. When the piston has reached the outermost limit of its travel, limited by the vent opening 36 in the outer wall of the cylinder, the blades should be fully feathered to a 90° angle, or approximately so, with respect to the plane of rotation.

The means for supplying fluid under pressure to the cylinder is here shown in the form of a rotary eccentric pump having an outer housing portion 37 and an inner rotor portion 38 which are rotatable about axes displaced with respect to each other. The rotor 38, as may be best seen in Figures 4 and 6, is slideably splined to a shaft 39 which will be described more fully hereinafter; and has mounted therein a pair of brushes or contact members 40 and 41, each being spring-pressed outwardly to maintain engagement with the inner wall of the pump housing 37 during relative rotation between the parts. The housing 37 is rotatable with the windmill, while the rotor 38 (so termed merely to follow conventional nomenclature) is held stationary by the shaft 39. As the windmill rotates, oil or other fluid is drawn in through the suction channel 42 which leads from an oil sump 43 at one point in the rim of the housing or hub 17. As may be best seen in Figure 3, this suction passage is drilled into the casting and around the bottom of the cylinder 33; and it is provided with a screen 43ª at its outer end. Oil drawn into the pump is compressed and delivered through the outlet passage 44 to the bottom of the cylinder 33. Since the annular piston 32 is sealed to the cylinder walls, as by a leather washer 45, the oil or other fluid must either lift or move the piston 32 or flow out of the opening 46 controlled by the valve 47. The capacity of the pump and the size of the opening 46 are so proportioned that this opening can always permit more fluid to leave the cylinder than the pump can deliver thereto, so that the position of the piston 32, and thus the pitch of the blades, is a function of the position of the control valve 47.

The means for actuating the valve 47 is best seen in Figures 3 and 4. The valve is normally urged outwardly, away from its opening, by a spring 48; and is urged inwardly either by automatic means, responsive to the rate of rotation of the windmill, or manually operable means.

In order to provide the automatic governing action a pair of weights 49 and 50 are pivotally mounted, as at 51 and 52. These weights are interconnected, as by the link 53, and normally maintained in inner position by springs 54 and 55. It will be readily apparent that the weights always take similar positions because of their interconnection by the link 53; and that as the rate of rotation of the windmill increases centrifugal force will tend to move them outwardly, against the resistance of the springs 54 and 55, to a position which is a function of the speed of rotation. The valve 47 is connected, through a lost motion connection for a purpose to be hereinafter described, to a lever portion 56 at the back of the weight 49, so that as the weight moves out upon faster rotation of the windmill the valve 47 moves further into its cooperating opening 46. Faster rotation of the windmill, therefore, not only increases the amount of fluid being delivered to the cylinder 33 by the pump, but also throttles or closes down its rate of flow from the cylinder through the opening 36, so that the pressure and amount of fluid in the cylinder builds up and moves the piston 32 to increase the pitch of the blades. The parts are so proportioned that when the windmill has reached a speed of rotation of 350 revolutions per minute, in one embodiment of my invention, further increase in wind velocity increases the pitch of the blades to maintain the rotation of the windmill substantially constant at this rate.

The housing 17 is made oil-tight, and serves as the oil reservoir from which the pump draws. At lower windmill speeds the sump 43 will, of course, not have any liquid in it during the major part of each revolution; but at these low speeds there is no need for operation of the governing mechanism. As the speed of the windmill increases centrifugal force causes the oil or other fluid used to spread completely around the periphery of the housing 17, so that as the windmill nears its desired maximum speed there will at all times be oil in the sump 43 to enable operation of the governing mechanism. In order to enable minor variation in the maximum speed, means is provided for placing additional spring resistance against the outward movement of the weights 49 and 50. This may be best seen in Figure 4, and comprises a spring 58 and screw adjustment means 59 which can be manually operated from the outside of the housing or hub 17. It will be understood that when the weights come into contact with the point of this screw additional resistance to their outward movement is provided, and the amount of this additional resistance will have a bearing on the terminal speed of the windmill.

The small central shaft 39, in addition to providing means for holding the rotor 38 of the pump stationary, provides means for additionally manually actuating the valve 47. As may be best seen in Figure 3, the end of the shaft 39 bears, through a ball, on a lever 60 pivoted at 61 and acting through a rod 62 and crank 63 on the valve 47. The slot 64 in the connection between the valve and the automatic governing means provides a lost motion connection enabling the valve 47 to be moved to its closed position when the shaft 39 is moved to the left (still speaking with respect to Figure 3), despite the position of the automatic governing mechanism at that time. As may be best seen in Figure 1, wires or cords 65 and 66 enable manual movement of the shaft 39 at any time, through actuation of a lever 67 pivoted at 68. If the shaft 39 is in the position shown in Figures 1 and 3 the automatic governing mechanism is operative, and the machine may be considered as running at the desired optimum speed. If it is desired to stop the windmill it is only necessary to pull the wire or cord 66, moving the shaft 39 to the left, and causing the valve 47 to close the opening 46. All oil delivered by the pump then remains in the cylinder, and shortly the piston will reach its furthest out position with the blades fully feathered into the wind. In this condition there is, of course, no further driving force derived from the wind, and the windmill will stop. Whenever it is desired to start the windmill again it is only necessary to pull the cord 65 and move the shaft 39 to the right, opening the valve 47 and permitting the oil in the cylinder to flow out of it under the pressure on it derived from the springs 34 and 35. This will cause the blades to change their pitch to the minimum pitch position again, whereupon, if there is any wind, the windmill will resume operation at once; and, as it reaches its desired operating speed, the automatic governing mechanism will again hold it at this speed.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

A windmill of the character described, including: a plurality of blades rotatable about their longitudinal axes; a pump, driven by rotation of the windmill, providing a source of fluid under pressure, said pump being of the rotary eccentric type mounted substantially concentric with the axis of rotation of said windmill, the inner element of the pump being stationary and the outer element rotating with the blades; a cylinder connected to the pump; a piston in the cylinder movable in one direction in response to fluid pressure in the cylinder; spring means for moving the piston in the other direction; means connecting the piston and blades, whereby movement of the piston effects rotation of the blades about their axes; and means responsive to the rate of rotation of the windmill for controlling the fluid pressure in the cylinder.

WILLIAM J. FIEDLER.